United States Patent [19]
Kinoshita

[11] Patent Number: 6,081,636
[45] Date of Patent: Jun. 27, 2000

[54] WAVELENGTH DIVISION MULTIPLEXING OPTICAL TRANSMISSION DEVICE AND WAVELENGTH DIVISION MULTIPLEXING OPTICAL TRANSMISSION SYSTEM

[75] Inventor: Junichi Kinoshita, Yokohama, Japan

[73] Assignee: Kabushiki Kaisha Toshiba, Kanagawa-ken, Japan

[21] Appl. No.: 09/100,375

[22] Filed: Jun. 19, 1998

[30] Foreign Application Priority Data

Jun. 20, 1997 [JP] Japan ................................. 9-164387

[51] Int. Cl.[7] ........................................ G02B 6/28
[52] U.S. Cl. ............................ 385/24; 385/37; 385/27; 372/6
[58] Field of Search ............................ 385/15–24, 27, 385/37, 31; 372/6, 23, 71, 97; 359/109, 114, 124

[56] References Cited

U.S. PATENT DOCUMENTS

| 4,958,357 | 9/1990 | Kinoshita | 372/96 |
| 5,910,962 | 6/1999 | Pan et al. | 385/24 X |

*Primary Examiner*—Phan T. H. Palmer
*Attorney, Agent, or Firm*—Loeb & Loeb, LLP

[57] ABSTRACT

A transmitter and a receiver for wavelength division multiplexing optical transmission need no multiplexer and can be made compact and manufactured easily while promising a high reliability of a system using them. By using second-order Bragg diffraction gratings to form the output mechanism, a plurality of DFB laser-type elements can be integrated so that their optical outputs adversely affect each other. Therefore, a plurality of lasers can be arranged coaxially to form a light source for wavelength division multiplexing optical transmission without using a multiplexer. By using the same mechanism on the part of a receiver, a demultiplexer can be omitted.

20 Claims, 9 Drawing Sheets

WAVELENGTH DIVISION MULTIPLEXING OPTICAL TRANSMISSION DEVICE AND WAVELENGTH DIVISION MULTIPLEXING OPTICAL TRANSMISSION SYSTEM

BACKGROUND OF THE INVENTION

This invention relates to a WDM (wavelength division multiplexing) optical transmission device and a WDM transmission system. More specifically, the invention relates to a light emitting device using a laser element capable of efficiently taking out light beams as radiation mode via second-order Bragg diffraction gratings and to a photodetector device. The invention further relates to a WDM optical transmission system including these devices.

WDM optical transmission is currently remarked as a technology which promises a remarkable increase in capacity that can be transmitted through already-provided optical fibers. In WDM optical transmission, a plurality of distributed feedback laser diodes (DFB-LD) are used as its light source. These DFB lasers are capable of oscillating in single longitudinal modes in wavelength bands different from each other. In conventional WDM optical transmission, these DFB lasers were provided on the part of a transmitter in a parallel arrangement of individual elements, or in a higher advanced type as arrayed monolithic integrated elements.

Figure 8A:
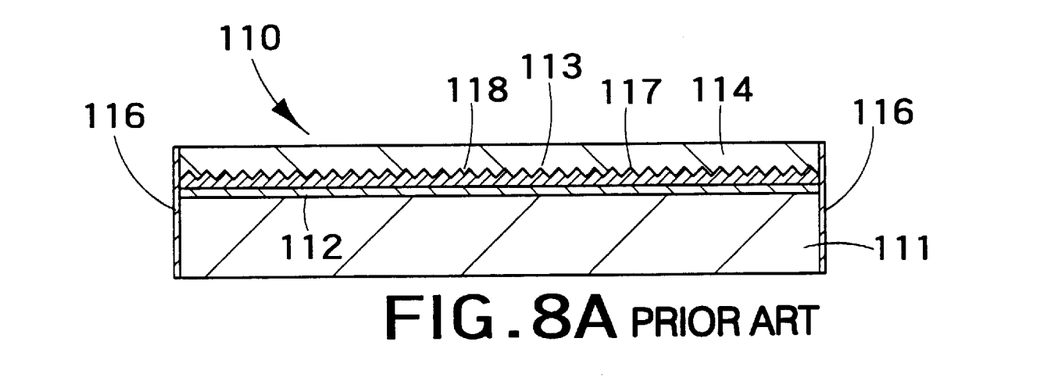
FIG. 8A is a longitudinal cross-sectional view showing a general construction of a conventional DFB laser.

FIG. 8A is a longitudinal cross-sectional view of a general construction of a conventional DFB laser. The DFB laser 110 is composed of a InGaAsP active layer 112 and an InGaAsP optical guiding layer 113 having a larger band gap than the active layer 112, which are stacked on an n-type InP substrate 111 as an active resonator. Further made thereon are diffraction gratings 117 including a λ/4 shift region 118 in the center of the cavity in which the phase is shifted by ¼ wavelength. Stacked thereon is a p-InP layer 114 to form a p-n junction. AR (anti-reflection) coats 116 are applied on both facets.

Figure 8B:
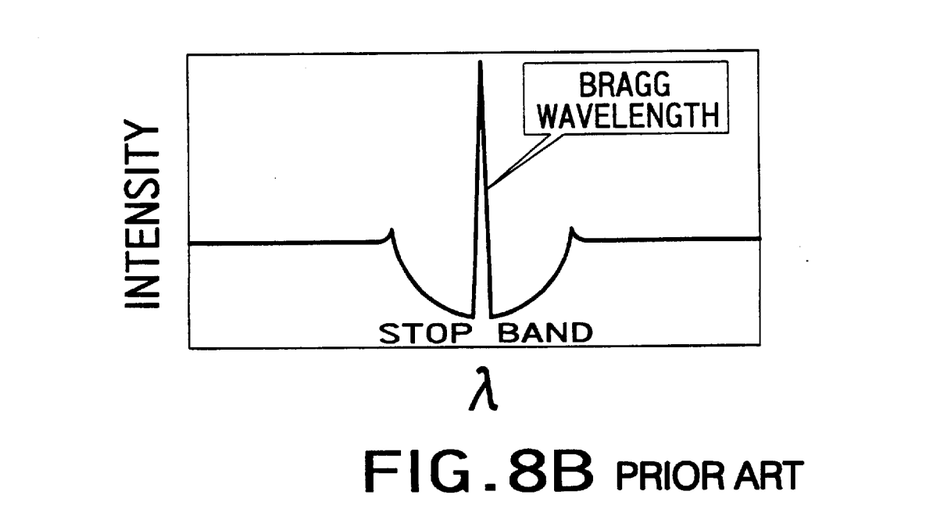
FIG. 8B is a schematic diagram showing oscillation wavelength characteristics of the DFB laser.

FIG. 8B is a schematic diagram showing oscillation wavelength characteristics of the DFB laser 110. As shown here, the DFB laser oscillates in the wavelength band near the Bragg wavelength ($\lambda_{Bragg}$). The "stop band" shown in FIG. 8B pertains to a state where transmitted light is minimized and most of light is reflected, as characteristics of the optical wave traveling through the waveguide.

The Bragg wavelength ($\lambda_{Bragg}$) can be expressed as $$N\lambda_{Bragg} = 2n_{eff}\Lambda \tag{1}$$

where $\Lambda$ is the period of diffraction gratings 117, and $n_{eff}$ is the effective refractive index of the laser waveguide 113. N is the order of diffraction. When N=2, for example, namely, in case of second-order gratings, the period $\Lambda$ of the diffraction gratings is twice the case of the first order.

The λ/4 shift DFB laser, namely, the DFB laser having anti-reflection coats 116 on both facets to prevent reflection and having the λ/4 phase shift region 118 in the diffraction gratings 117 located at the center of the laser cavity, oscillates at the Bragg wavelength at the center of the stop band as shown in FIG. 8B.

On the part of a transmitter of WDM optical transmission, a plurality of λ/4 shift DFB lasers are arranged in parallel. They can be used as a WDM light source capable of oscillating at a plurality of wavelengths by changing periods of individual diffraction gratings.

Figure 9A:
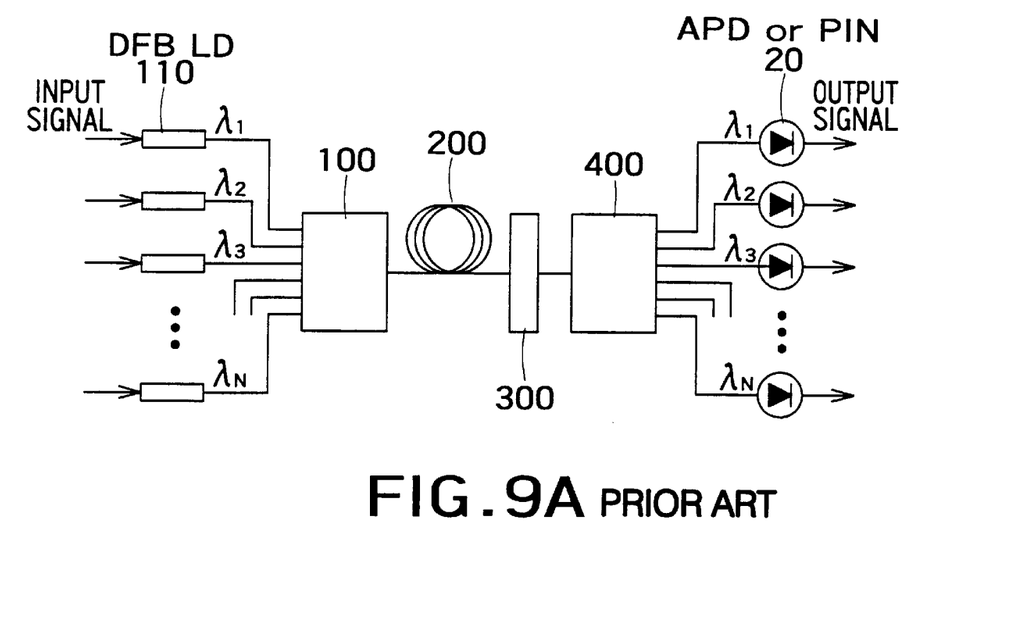
FIG. 9A is a diagram generally showing a basic structure of a conventional WDM system.

FIG. 9A is a diagram schematically showing a basic structure of the WDM system. On the part of the transmitter, a plurality of DFB lasers 110 oscillating at different wavelengths $\lambda_1$ to $\lambda_n$ in constant intervals are arranged. These DFB lasers 110 are modulated directly, and their optical outputs are multiplexed in the multiplexer 100 and transmitted through an optical fiber 200. On the part of a receiver, the optical signal is amplified by an optical amplifier 300, and demultiplexed into original wavelengths by a demultiplexer 400. Each demultiplexed light component is converted into an electric signal by an avalanche photodiode (APD), PIN photodiode (PIN-PD), or any other appropriate photodetector 20.

Figure 9B:
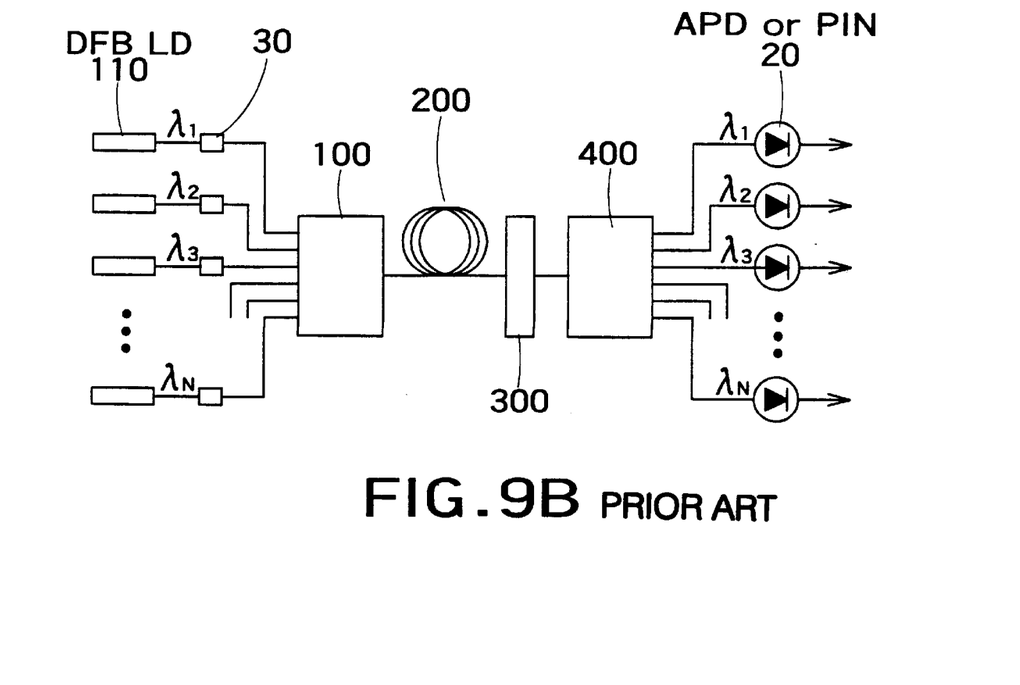
FIG. 9B is a diagram generally showing another conventional WDM system.

FIG. 9B is a diagram schematically showing another construction of the WDM system. In the construction shown here, lasers 110 are not modulated directly, but driven by a d.c. signal, and their optical outputs are modulated by external modulators 30. Therefore, the system shown here is more advantageous than the system shown in FIG. 8A in that the modulation speed is higher.

Figure 10:
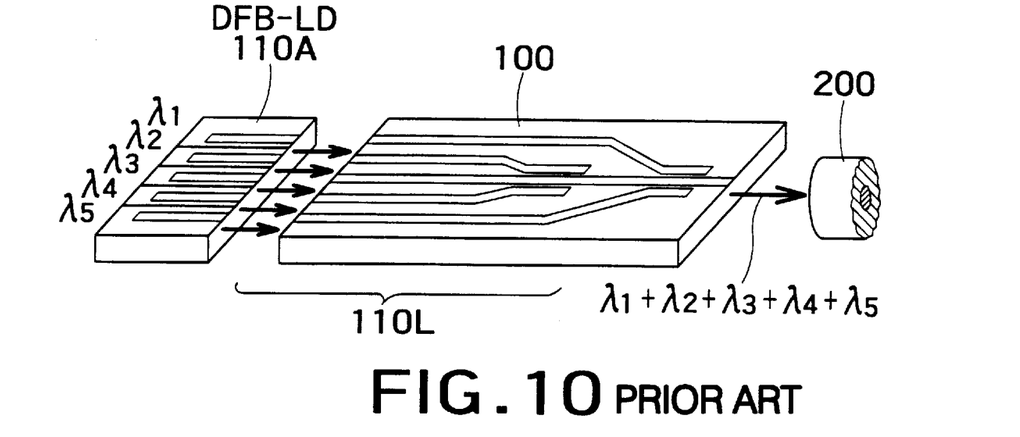
FIG. 10 is a perspective view generally showing a structure of a transmitter in the conventional WDM system shown in FIG. 9A.

FIG. 10 is a perspective view schematically showing an exemplary construction of the transmitter of the WDM system shown in FIG. 9A. In the construction shown here, the transmitter includes an integrated DFB laser array 10A for five different wavelengths and a multiplexer made of a LiNbO$_3$-based Ti-diffused waveguide. Transmitters of this type are disclosed in, for example, Toshiba Review, 40[7] (1985), Okuda et al. p.570, and its English version (1985) p.9, Optoelectronics Technology in Toshiba, H. Okuda et al.

In the laser array 110A shown in FIG. 10, DFB lasers 110 are arranged to align their active layer stripes in parallel, and are integrated monolithically. Each DEB laser emits its optical output from a facet at the end of the cavity stripe. That is, the laser array 110A emits laser beams corresponding to the number of channels in parallel from different facet positions. To collectively enter these optical outputs into a single fiber 200, the multiplexer 100 is indispensable. This means an increase in number of parts of the system and makes it complicated.

The use of the multiplexer 100 invites another problem that the multiplexer 100 must be assembled so that its portion for entry of light be in an accurate position relative to the optical output facet of the laser array 110A, and the alignment procedure of the optical axis takes time.

Additionally, the multiplexer 100 needs a long branch-shaped waveguide portion 100L, as shown in FIG. 10, in order to guide beams of the light from different entry positions into a single waveguide. Therefore, the multiplexer 100 needs a length longer than the laser array 110A, and results in occupying a large space and disturbing down sizing the transmitter.

A further problem with the multiplexer 100 lies in a high cost because elements obtained from a single wafer are much less when the multiplexer 100 is monolithically integrated at the output of the laser array 110A.

If the lasers are arranged in series to align their cavities coaxially for the purpose of omitting the multiplexer 100, then the light emitted from a former-stage laser adversely affect the cavity of a latter-stage laser to cause cross-talk of signals. Therefore, the multiplexer 100 could not be omitted from conventional WDM systems.

In the receiver of the WDM system, a demultiplexer 400 is indispensable to divide the multiplexed signal into different wavelengths to deliver them to individual photodetectors 20. Also the demultiplexer 400 involves the same problems, and has been desired to omit from the system from the viewpoint of the space and assemblage.

SUMMARY OF THE INVENTION

It is therefore an object of the invention to provide a novel WDM optical transmission device and a novel WDM optical transmission system which do not need a multiplexer and can be therefore made compact and assembled easily, but are operative with a high reliability.

The WDM optical transmission device includes a plurality of GCSEL (grating-coupled surface emitting laser) stacked one over another to form a coaxial output system. Thus, the lasers form an inexpensive reliable WDM light source not using a multiplexer.

The device may be configured so that an output for a modulator be extracted from a position distant from the coaxial light extraction structure and modulated by the modulator, to introduce light into the coaxial structure thereafter. This arrangement prevents modulation and mixture of outputs from other laser elements while integrating external modulators for modulating output light by control of absorption. This mode of modulation realizes a modulation speed as high as 10 Gbps, which is higher than that of direct modulation.

By utilizing the fact that only from the second-order diffraction gratings radiation mode beams in the direction normal to the cavity direction can be obtained, the coaxial output structure can be made more easily.

By making a waveguide structure which causes phase shifting or an effective phase shift in the diffraction gratings, radiation mode at the output extracting portion on the common axis of the laser elements can be enhanced to improve the output efficiency.

When using an integrated structure vertically stacking GCSELs on a semiconductor substrate, the WDM optical transmission device can be made significantly compact.

On the other hand, when the diffraction gratings are formed on a side surface of the waveguide normal to the substrate surface, radiation mode lights can be coaxially output from the surfaces normal to the cavity. In this sense, the element is regarded as a grating-coupled edge emitting laser (GCEEL) rather than GCSEL. The device can be made by much less steps of growing crystals, i.e. by substantially the same steps required for a conventional discrete element, and is suitable for monolithic integration.

Moreover, the waveguides may be used to guide coaxial outputs from GCEELs, especially, so that these outputs do not diverge among individual elements. Since radiation mode is a narrow beam not expanding in the cavity direction, a slab waveguide is sufficient to confine light in the thickness direction with a larger divergent angle, and can be readily processed, omitting treatment for confinement in the transverse direction of the waveguide.

The deeper the location of a laser-type element, the larger the possibility of scattering or guiding loss of its output before reaching the front surface. To cover the loss, the coaxial waveguide preferably has an amplifying function.

The use of a material with less optical loss to make the coaxial portion, the use of a window in the electrode or removal of the coaxial portion from the active layer of each element is effective for preventing attenuation of light from former elements and for preventing adverse affection to the active layer by outputs from former elements which will otherwise cause cross talk.

When an anti-reflection coat is applied onto the incident surface of exit surface of light, optical loss or interference to laser elements by undesirable reflection can be prevented.

A monitor PD (photodiode) for APC (automatic power control) of the laser may be arranged or monolithically integrated in a direction other than the output direction to stabilize the operation of the laser element.

The invention is not limited to a laser element itself, but is extended to a transmitter or a system using it for WDM optical transmission.

When the active layer is activated as a light absorbing layer by applying a reverse bias, and the spectroscopic function of the second-order diffraction gratings are utilized, it can be used as the WDM optical transmission device only by inverting the direction of light while maintaining the same construction as the laser element.

The invention is not limited to a photodetector device, but is extended to a receiver and a system using it for WDM optical transmission.

As summarized above, the invention provides a WDM optical transmission device with a simple structure and a high reliability, and its industrial contribution is great.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DETAILED DESCRIPTION OF THE PREFERRED EMBODIMENTS

The invention uses the second-order diffraction gratings as its output mechanism to prevent crosstalk or interference of optical outputs from a plurality of DFB laser elements to each other. This results in permitting coaxial arrangement of a plurality of lasers and in realizing a light source of WDM optical transmission without using a multiplexer.

The same mechanism can be used on the part of a receiver to omit the demultiplexer.

Before explaining embodiments of the invention in detail, roughly explained is a grating-coupled surface emitting laser (GCSEL).

Figure 11A:
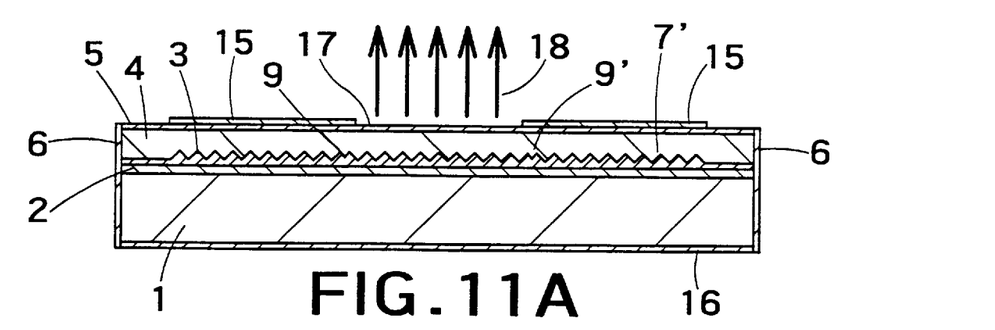
FIG. 11A is a cross-sectional view of a general construction of GCSEL.

FIG. 11A is a cross-sectional view of GCSEL. GCSEL is a DFB laser using second-order or higher-order gratings, or a DBR (distributed Bragg reflector) laser using them.

GCSEL is made by stacking on an n-type InP substrate 1 an InGaAsP active layer 2, an InGaAsP guiding layer 3 having a larger band gap than the active layer 2 and by making second-order diffraction gratings 7' thereon. The "second-order diffraction gratings" herein pertains to diffraction gratings in which the "order of diffraction N" in Equation (1) is 2. The diffraction gratings 7' includes two $3\lambda/8$ phase shift regions 9, 9' formed at positions sandwiching the cavity center. Stacked on the diffraction gratings 7' are a p-InP layer 4 and a p-InGaAsP ohmic contact layer 5 (the ohmic contact layer 5 is not shown in FIG. 1 for simplicity). The contact layer 5, p-InP layer 4, guiding layer 3 and active layer 2 are selectively removed by etching into a stripe-shaped mesa configuration, and are buried in a p-InP layer and an n-InP layer (not shown) stacked around the mesa structure to form a buried heterostructure (BH).

Electrodes 15 and 16 are formed on upper and lower surfaces. The p-side electrode 15 has formed a window 17 for outputting light at a position located between two $3\lambda/8$ phase shift regions 9, 9'.

Oscillation of GCSEL occurs in the cavity 2 extending in parallel with the substrate 1 like a conventional DFB laser. A difference thereof lies in that also the radiation mode 18 irradiated from the diffraction gratings can be used as its optical output in addition to the guided mode irradiated from the facet. When the diffraction gratings are the second-order gratings, light is irradiated in a direction normal to the cavity, and becomes a surface emitting optical output.

Radiation mode light is produced through the gratings by coupling to the guided mode components in two directions reciprocating in the waveguide. Therefore, radiation mode light include two components obtained from these two directions. Optical output can be controlled depending upon whether these two components interfere to be constructive each other or to be destructive each other. If the interference is controlled appropriately, an intensity distribution of the radiation mode output along the cavity direction can be produced.

A measure for realizing it is as explained below. That is, regions for shifting the phase by $3/8$ of the wavelength in the waveguide ($3\lambda/8$ phase shift regions) are provided at two positions near the center of GCSEL. Then, constructive interference occurs between them to enhance two components of radiation mode light with each other and increases the optical intensity. This structure, as a single element, has already been applied for a patent by the present Inventor (Japanese Patent Application 63-317818, U.S. Pat. No. 4,958,357, European Patent Application 88312036.2, Korean Patent 058391, and reported by J. Kinoshita in IEEE Journal of Quantum Electronics, Vol. QE-26, No. 3, 1990, p.407).

Figure 11B:
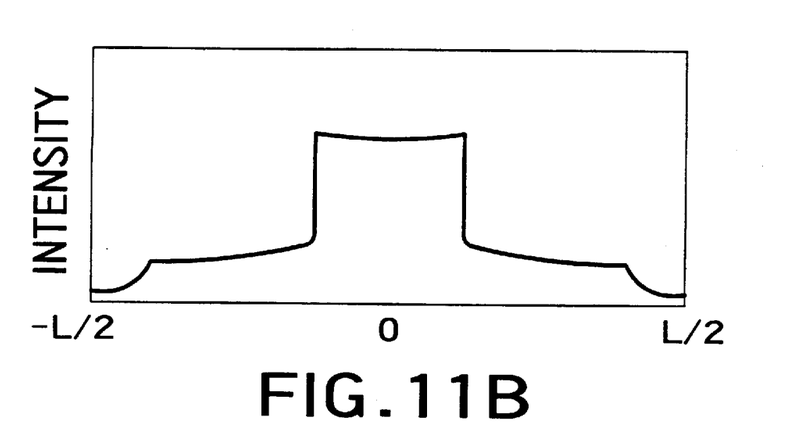
FIG. 11B is a schematic diagram showing optical intensity distribution of radiation mode light of GCSEL.

FIG. 11B is a schematic diagram showing an optical intensity distribution of the radiation mode light. Part of two traveling waves reciprocating in the waveguide is emitted by the second-order diffraction gratings 7' as a narrow divergence beam 18 peculiar to radiation mode light in upward and downward directions. Upward radiation can be made larger by so configuring the diffraction gratings.

The divergent angle along the guiding direction (FWHM: full width at half maximum) is several degrees. For simplicity, the irradiated component is disregarded as being decayed in the substrate. Then, two radiation mode light components interfere to enhance each other due to a change in phase in the region between the $3\lambda/8$ phase shift regions 9, 9', and increase the optical intensity as shown by a solid line in FIG. 11B. This is extracted as an optical output. This is the principle. If $\lambda/8$ phase shift is used, then the components interfere to weaken each other, and the output becomes very small. The radiation angle of a radiation mode beam in the transverse cross-section is not so narrow as that in the cavity direction, and has a full width at half maximum around 30°.

The Inventor also proposed to integrate GCSEL of this type and a surface-type external modulator (Japanese Patent Application 7-219010). Also a similar WDM light source was proposed by the Inventor (Japanese Patent Application 6-55445).

Figure 12A:
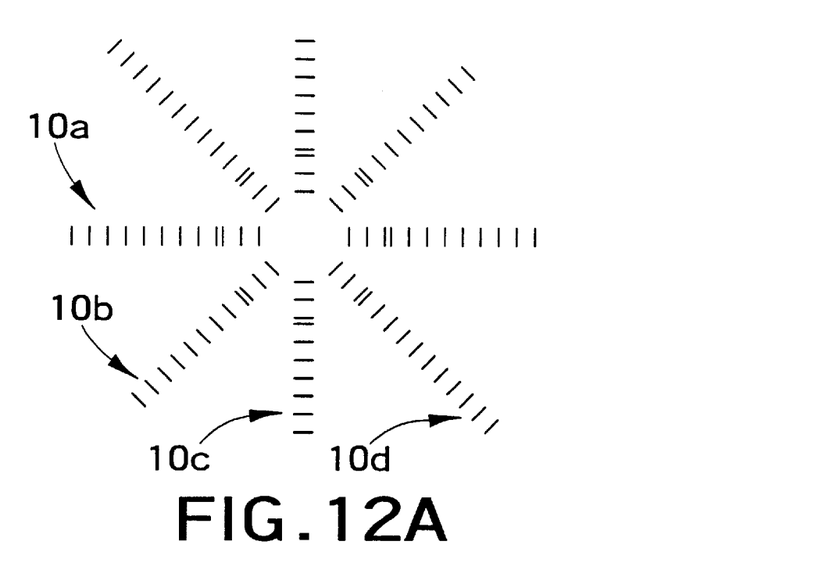
FIG. 12A is a schematic plan view showing the construction of a WDM light source proposed by the Inventor.

FIG. 12A is a schematic plan view showing the construction of the WDM light source proposed before by the Inventor. The light source shown here has a common single point (concentric point) within a plane as its radiation mode output point, and GCSELs 10a through 10d different in period are arranged radially within a common plane.

Figure 12B:
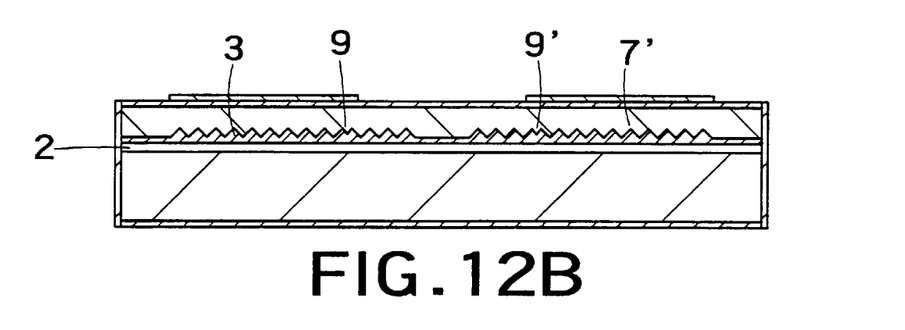
FIG. 12B is a general cross-sectional view of the light source.
Figure 12C:
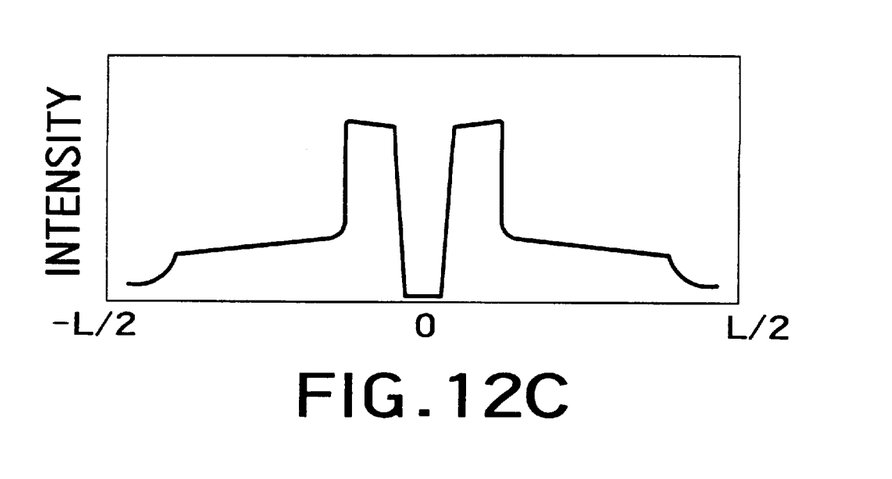
FIG. 12C is a schematic diagram showing optical intensity distribution of radiant light along its axial direction.

FIG. 12B is a cross-sectional view of the light source, and FIG. 12C is a schematic diagram showing optical intensity distribution of radiant light along its axial direction. In the structure shown here, no diffraction gratings is provided because diffraction gratings of a plurality of periods overlap and cannot be made separately in the region near the common center point. Therefore, radiation mode output cannot be obtained at the common point. That is, radiation mode light exiting from around it is used as the output. This means that the important central portion has been a dark portion not emitting light as shown in FIG. 12C. Moreover, the structure shown here, where respective lasers are arranged in radial directions, cannot integrate a large number of laser stripes due to a limited area in the circle.

The present invention overcomes this problem as well.

The invention employs three-dimensional arrangement of laser devices.

Additionally, the invention uses a structure suitable for monolithic integration, and integrates DFB lasers having second-order diffraction gratings on side surfaces of waveguides in an array. The device is neither of a conventional surface emission type nor of a conventional cavity-lengthwise edge emission type. It is a device which irradiates light normally of the cavity-lengthwise direction. Since each element is configured to pass an output from another element across its narrow cavity, affection to the next element the output passes through can be minimized. The passing portion can be made transparent. Therefore, outputs from a number of elements can be combined coaxially, and can be multiplexed. Also the integration density is increased.

Explained below is an embodiment of the invention applied to an InGaAsP/InP device with reference to the drawings.

Figure 1A:
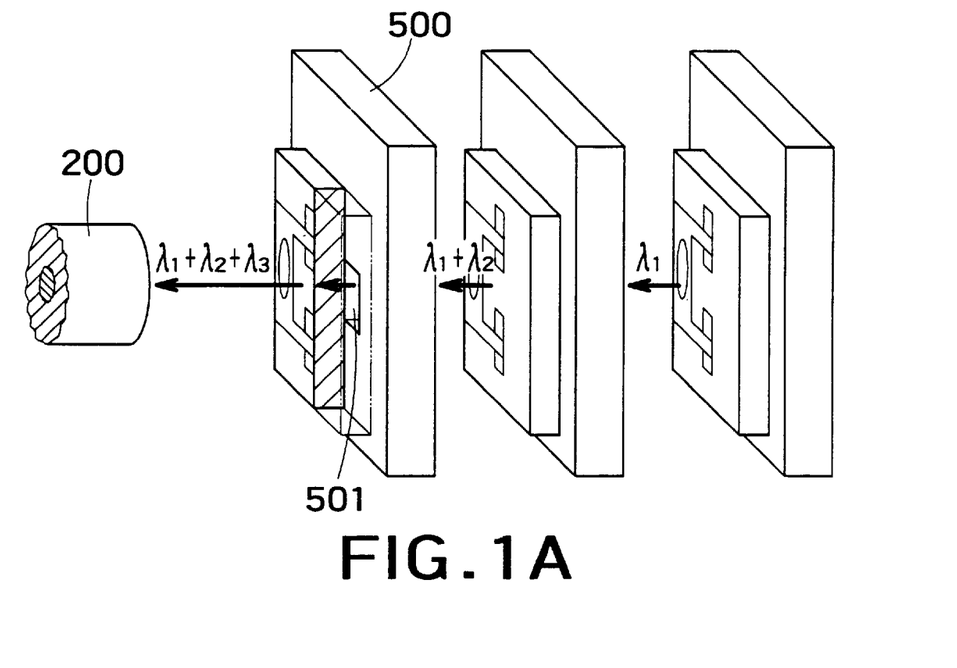
FIG. 1A is a perspective view generally showing a WDM optical transmission device according to the invention in which GCSELs are stacked to align their optical outputs coaxially.
Figure 1B:
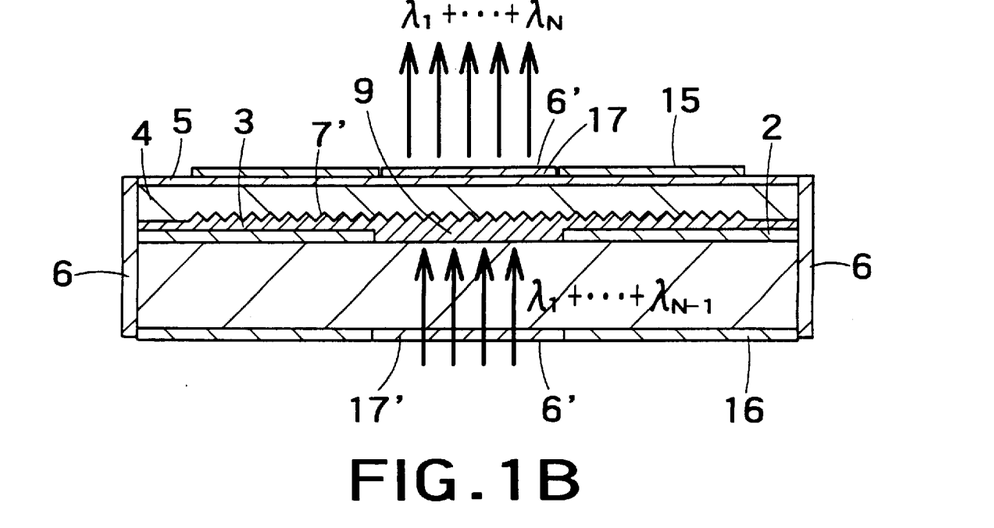
FIG. 1B is a cross-sectional view generally showing GCSEL in an enlarged scale.

FIG. 1A is a perspective view schematically showing a WDM optical transmission device having GCSELs stacked to align their optical outputs coaxially, and FIG. 1B is an enlarged cross-sectional view schematically showing GCSEL.

Each GCSEL used in the invention has essentially the same structure as that shown in FIG. 11A. However, in GCSEL used in the invention, the diffraction gratings 7' of each laser element may be uniform second-order diffraction gratings with no phase shift. In GCSEL, only the second-order diffraction gratings can output radiation mode light normally to the cavity length. Therefore, by using second-order diffraction gratings, a coaxial output structure can be made easily.

Alternatively, like the device shown in FIG. 11A, by making a guiding structure causing phase shifting or an effect of phase shifting in the diffraction gratings 7', the radiation mode light at the coaxial output portion can be enhanced to increase the output efficiency of each element.

In the device shown in FIGS. 1A and 1B, the active layer 2 is removed in the coaxial portion of GCSEL. As a result, the effective refractive index at the cavity center becomes smaller, and the effect of phase shifting (about $\lambda/4$) is obtained. The effective phase shift 9 increases the intensity of radiation mode light at the position of the output window 17 at the center of the cavity. Additionally, removal of the active layer from the coaxial portion gives the additional effect of preventing a residual cross talk introduced due to affection to the active layer, even if small, by output light passing therethrough from a former stage.

The electrode 16 on the substrate also has a window 17'. Each heat sink 500 has formed a hole 501 in the coaxial position.

In this manner, by partly removing the active layer and electrodes to make coaxial portions substantially transparent, light from GCSEL in a latter stage is not blocked and can enter into the optical fiber 200.

Removal of the coaxial portion of the active layer from each element to maintain only the transparent guiding layer with the diffraction gratings at the coaxial cladding layer and the portion additionally contributes to preventing crosstalk introduced to the absorptive active layer by the light from a former stage.

Anti-reflective coats 6' are applied on front and back surfaces of each element to prevent an optical loss or interference to laser elements by any undesirable reflection.

These GCSELs as essential elements having different periods of diffraction gratings to oscillate at different wavelengths are arranged coaxially with output light and collectively coupled to a fiber 200.

By stacking GCSELs manufactured separately and selected, individual semiconductors not requiring integration process can be arranged appropriately to form a WDM light source not using a multiplexer. Omission of the multiplexer results in no trouble caused by the multiplexer itself and no trouble derived from combination, such as deviation of optical axes, and therefore improves the reliability of the WDM system.

Figure 2:
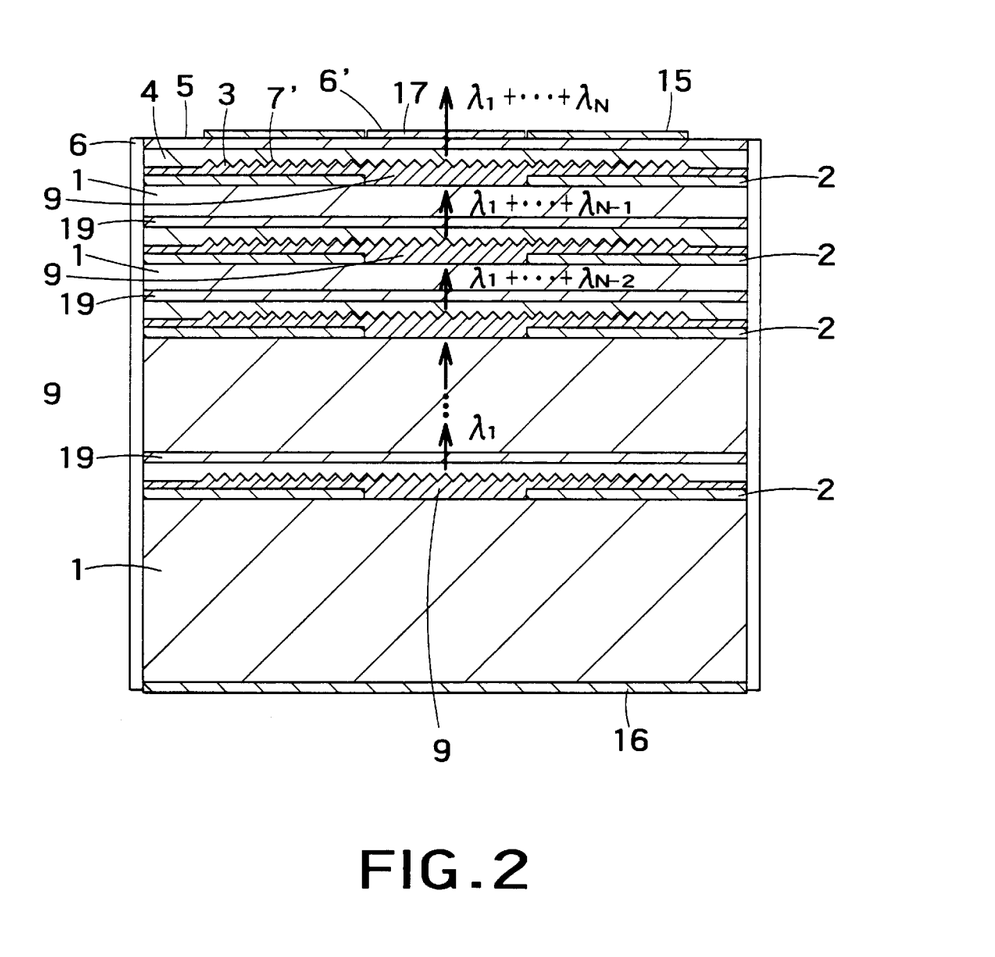
FIG. 2 is a cross-sectional view generally showing a WDM optical transmission device in which GCSELs are vertically stacked on a substrate.

FIG. 2 is a cross-sectional view sketching a WDM optical transmission device in which GCSELs are stacked vertically on a substrate. The light source shown here is made by stacking a number of GCSEL elements as shown in FIG. 1B corresponding to the number of wavelength channels. Semi-insulating InP layers 19 are interposed between every adjacent GCSEL elements for electrical isolation between elements.

Also in the device shown in FIG. 2, the active layer 2 is removed in each GCSEL at the coaxial portion. As a result, the effective refractive index is smaller at the cavity center to realize effective phase shifting (about $\lambda/4$). The effective phase shift 9 increases the intensity of radiation mode light at the position of the output window 17 at the center of the cavity. Additionally, removal of the active layer from the coaxial portion gives the additional effect of preventing crosstalk which could be introduced to the active layer, even if small, by output light passing therethrough from a former stage.

By integration of GCSEL elements, the process and time for coaxially aligning elements having been mounted individually can be omitted.

Each element is buried in a semi-insulating semiconductor (not shown) applied at both sides of the active layer stripe thereof to form a BH (buried hetero)structure permitting a current to flow only into the active layer. Therefore, the electrode (not shown) can be made at a position distant from the active layer stripe to supply the current through semiconductor layers of p and n conduction types interposed between the electrode and the active layer stripe.

Figure 3:
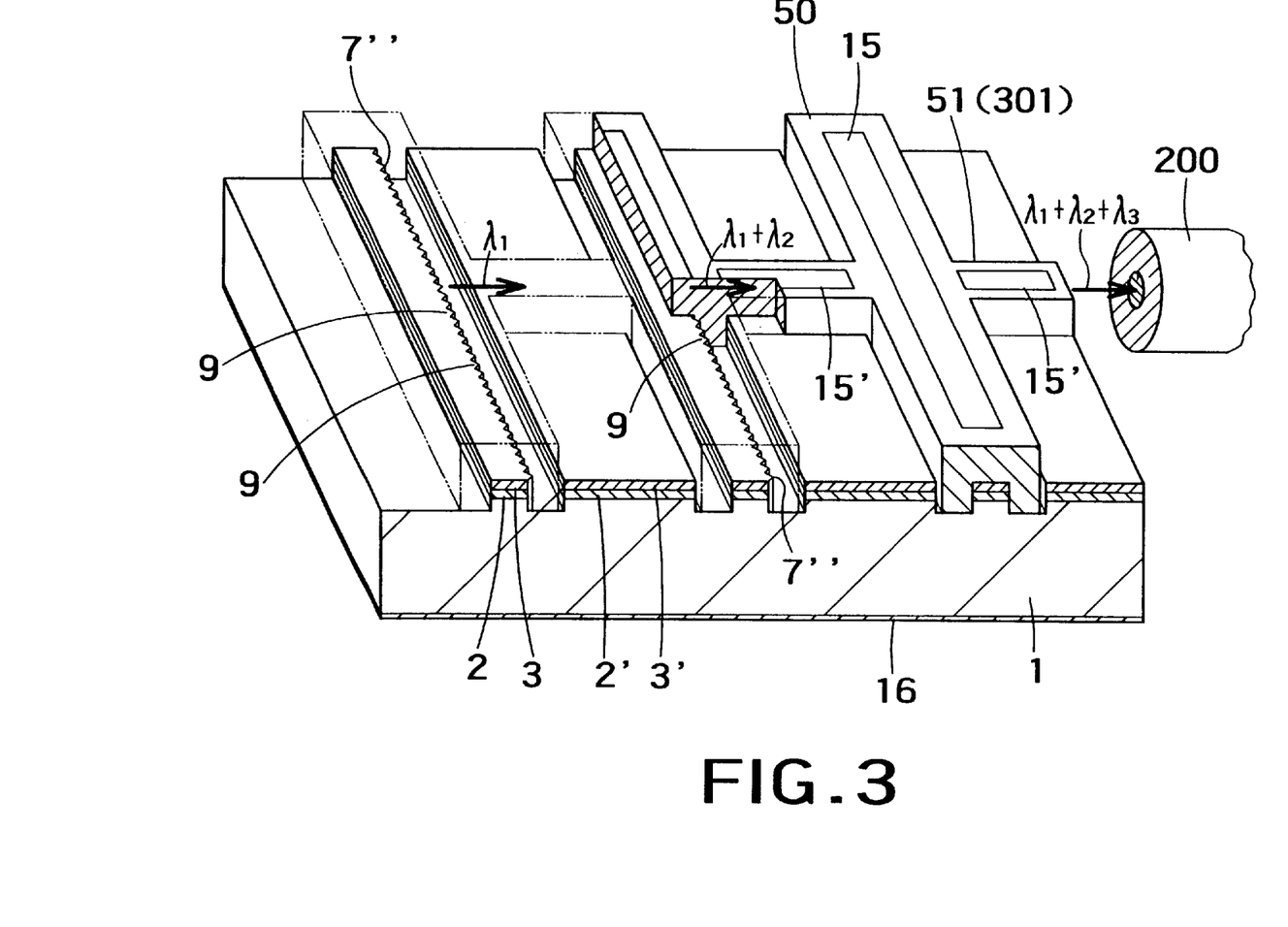
FIG. 3 is a perspective view generally showing a WDM optical transmission device integrating laser elements having a different structure from GCSEL to align their radiation mode outputs along the common axis.

FIG. 3 is a perspective view sketching a WDM optical transmission device in which laser elements having a construction different from GCSEL are integrated to align their radiation mode optical outputs coaxially. In each laser element, second-order diffraction gratings 7" is formed on a side surface of the waveguide normal to the substrate surface. Therefore, radiation mode light is output from the edge normal to the cavity. Thus, the laser element may be named GCEEL (grating-coupled edge emitting laser) and not GCSEL.

FIG. 3 shows only the essential structure for simplicity. For the same reason, only three wavelengths of $\lambda 1$, $\lambda 2$ and $\lambda 3$ are shown as channel wavelengths. Former stage elements oscillating at $\lambda 1$ and $\lambda 2$ (elements remoter from the fiber) are illustrated in see-through modes to show structures on active layer stripes 2 for better understanding of diffraction gratings 7 and others.

The circumference of the active stripe 2 and waveguide the layer 3 in each element, that is, their side surfaces and upper surface, are buried in a mesa stripe 50 of a p-InP layer 4. This corresponds to the BH-type guiding structure explained before. The width of the stripe 50 is small to minimize the parasitic capacitance by p-n junction. Usually, also the reverse p-n junction is formed for more efficient current confinement into the active layer 2. However, it is not the essence of the present invention, and not illustrated here. Independent p-side electrodes 15 are provided in individual elements to individually apply signals to respective lasers for modulation, and they are connected to bonding pads, not shown.

In accordance with a high-speed transistor used for modulation of the laser, the n-InP layer 1 and the p-InP layer 4 are often inverted to level the p-side to a common potential. In the example shown here, however, the n-side electrode 16 is leveled to the common potential.

In order to more reliably guide the radiation mode output irradiated in the edge direction normal to the cavity stripe in the coaxial direction to the fiber 200, a ridge waveguide 51 is formed between every adjacent two laser elements. The ridge waveguide 51 maintains an optically amplifying layer 2' of the same composition as the active layer 2. Therefore, by applying a bias voltage to the p-side electrode 15' electrically isolated from the laser portion, optically amplifying function is readily realized. That is, the ridge waveguide 51 behaves also as an optical amplifier 301.

The optically amplifying function in the present invention is very useful because an optical output from a former stage, subject to scattering or other loss, can be amplified larger.

Even in a structure without the ridge waveguide 51, where the amplifying layer 2' and the waveguide layer 3' extend as a slab waveguide, the coaxial property of output light is ensured because the divergent width of the radiation mode light beams in the cavity direction is very small. That is, the device may be simply configured to guide only the divergence in the substrate direction by a slab waveguide without using the ridge waveguide. Since radiation mode beams are narrow beams not expanding in the cavity direction, while using means for confinement of light in the thickness direction with a larger divergent angle, means for confinement of light in the transverse direction of the waveguide may be omitted to simplify the construction.

However, to ensure the optically amplifying function, a bias is preferably applied only to the coaxial portion for a better efficiency of power. From this point of view, the use of the ridge waveguide 51 is desirable.

Output edges are normally covered by anti-reflection (AR) coats, but they are omitted from illustration for simplicity.

In the device shown in FIG. 3, phase shift means 9 are provided at both sides of the coaxial portion. The phase shift means 9 increase the intensity of radiation mode light at the coaxial portion in the cavity center.

Also the WDM optical transmission device shown in FIG. 3 needs no multiplexer. The construction shown in FIG. 3 facilitates the process of crystal growth and the process of making electrodes as compared with the vertically integrated device shown in FIG. 2 because conventional technologies for integration of parallel arrays can be used directly. That is, for manufacturing the light source shown in FIG. 2 where GCSELs are stacked in the longitudinal direction, the process of making the diffraction gratings and the process of growing a crystal must be repeated by the number corresponding to the number of channels. Also for making electrodes, patterning cannot be made simultaneously.

In contrast, in the light source integrating GCEELs as shown in FIG. 3, the process of crystal growth and the patterning process need not be repeated so many as the number of channels, and the manufacturing process is simplified significantly. That is, the construction shown in FIG. 3 is suitable for monolithic integration.

Figure 4:
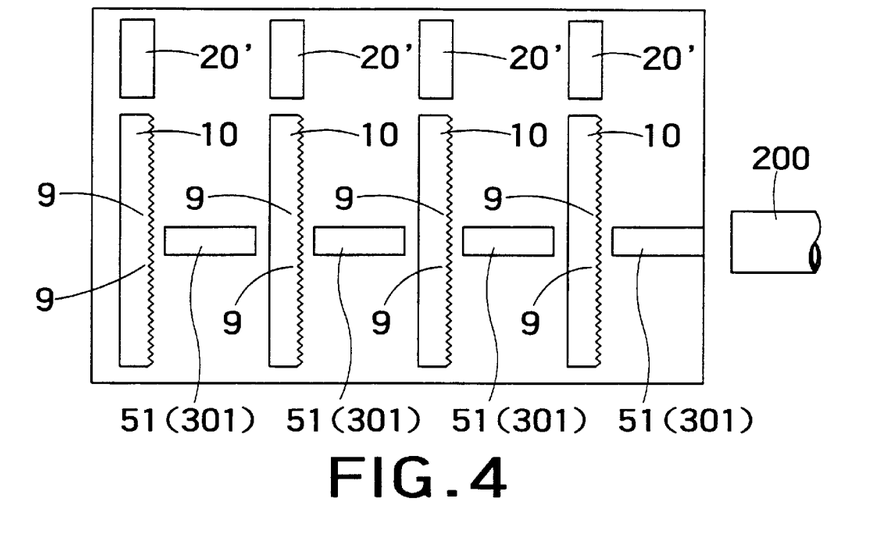
FIG. 4 is a plan view generally showing a integrated light source having a construction similar to FIG. 3.

FIG. 4 is a plan view schematically showing a integrated light source having a structure similar to FIG. 3. The light source shown here is different in that photodetectors 20' are provided at one side of stripes of laser elements 10. The photodetectors 20' may be made of a material having the same composition as that of the active layers or in form of InGaAs layers absorbing more light. Needless to say, their electrodes are separated and electrically insulated from the laser elements, and supplied with a reverse bias to operate as photodiodes. The photodetectors 20' receive guided mode light (designed to become weaker near edges) from respective lasers 10, and convert them into electric signals. In this manner, APC (automatic power control) for monitoring lasers and stabilizing the operation of lasers can be realized easily.

Also in the device shown in FIG. 4, phase shifting means 9 may be provided at both sides of the coaxial portion to increase the intensity of radiation mode light.

Figure 5:
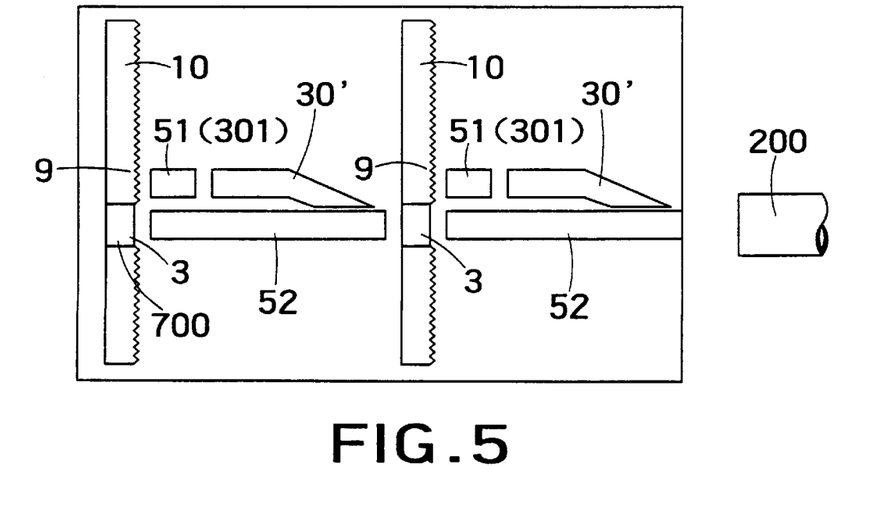
FIG. 5 is a plan view generally showing a WDM optical transmission device integrating external modulators.

FIG. 5 is a plan view schematically showing a WDM optical transmission device integrating external modulators. The light source shown here is somewhat different from the constructions explained above because the external modulators configured to modulate output light by controlling the optical absorptive coefficient, or the like, and need means for preventing that an output from another laser element is modulated together with an output of a particular laser element and mixes into its own output. Therefore, modulators are located distant from the coaxial structure in the direction of the path for externally extracting light so as to introduce light into the modulators to modulate it and to introduce the modulated light into the coaxial structure.

In FIG. 5, radiation mode light output from each second-order diffraction gratings 7' in each of the laser elements 10 is introduced into the ridge waveguide 51 (301) having an amplifying function. Each laser element 10 is driven by a D.C. signal.

An optical output amplified in the ridge waveguide 51 is introduced into an EA (electro-absorption) modulator 30' driven by a reverse bias and modulated there. In this process, optical modulation in each element can be done independently from other elements by controlling the signal applied to the EA modulator 30'. An optical output from the EA modulator 30' is introduced into a coaxial output waveguide 52. In the stripe layer (700) of each laser element 10, the second-order diffraction gratings are removed from the portion in alignment with the coaxial output waveguide 52 not to generate radiation mode output and to thereby prevent interference. Also the active layer of the laser element is removed to form a transparent waveguide layer 3.

In the device shown in FIG. 5, phase shifting means 9 may be provided at both sides of the output to the ridge waveguide 51 (301).

The light source shown in FIG. 5, in which external modulation can be employed, has an additional advantage, namely, capability of higher-speed modulation than direct modulation, higher than 10 Gbps(gigabit per second).

Next explained is an optical receiver according to the invention.

Figure 6:
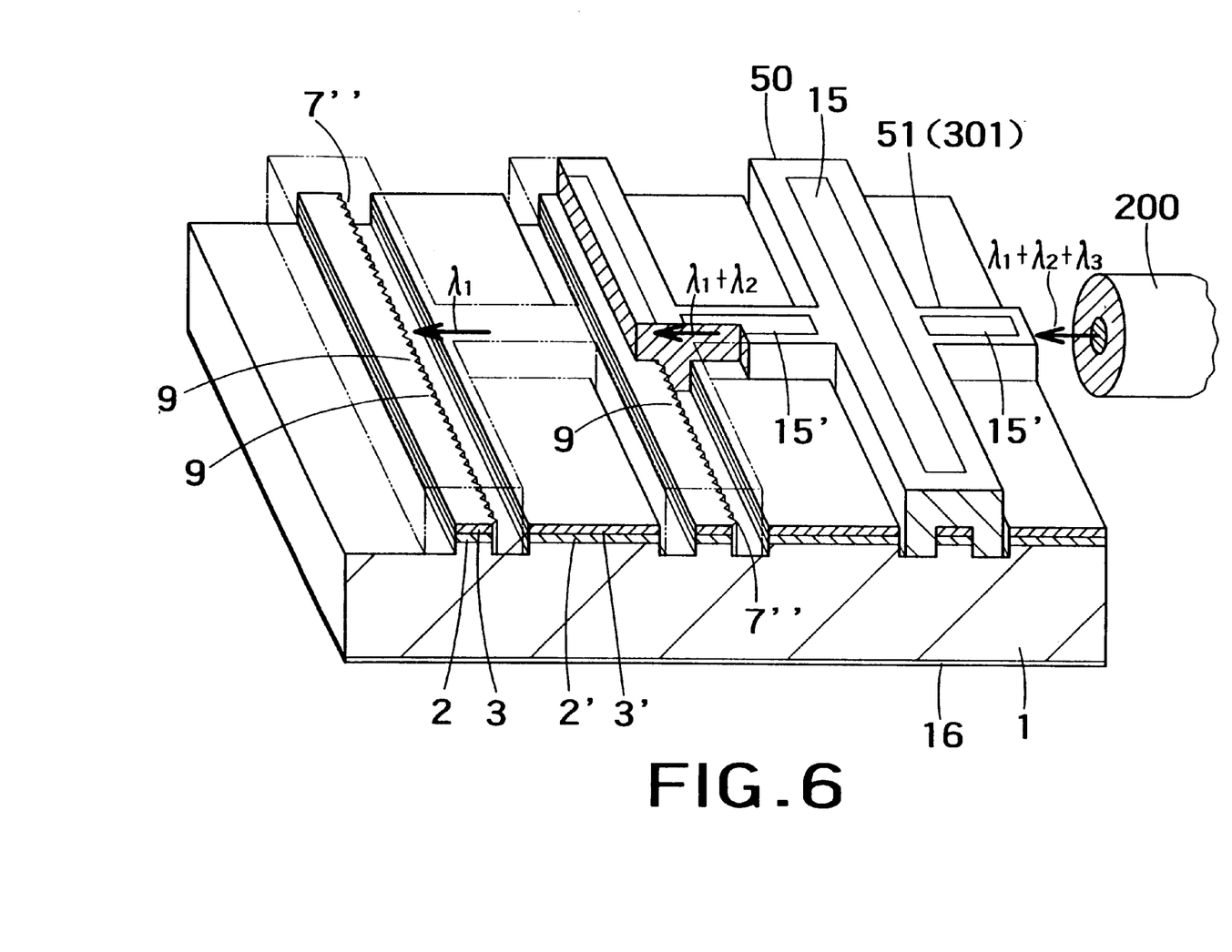
FIG. 6 is a perspective view generally showing an optical receiver for WDM optical transmission according to the invention.

FIG. 6 is perspective view schematically showing an optical receiver for WDM optical transmission according to the invention. The receiver shown here has a construction similar to the optical transmitter shown in FIG. 3. That is, the active layer 2 used in the laser element 10 shown in FIG. 3 can be used as a photodetector by applying a reverse bias thereto.

First introduced is a wavelength-multiplexed optical signal through the optical fiber 200. The optical signal is optically amplified in the ridge waveguide 51 (301), and input to respective photodetector elements. The second-order diffraction gratings 71" in each photodetector element orients only an input optical signal of $\lambda N$ corresponding to its own period to the active layer, i.e. the absorption layer 2, of the photodetector element, and the optical signal is converted there into an electric signal. The remainder light travels through it to the next-stage photodetector element, and another wavelength component is selected and converted into an electric signal, similarly.

In this manner, the invention realizes a compact receiver for WDM optical transmission, which needs neither a demultiplexer nor an amplifier.

Figure 7:
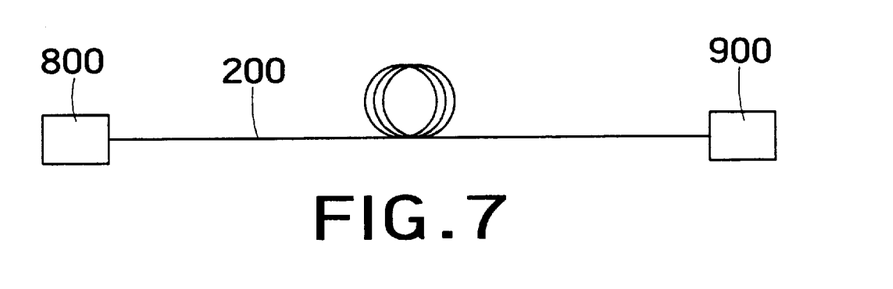
FIG. 7 is a schematic diagram of a WDM optical transmission system according to the invention in which an integrated laser light source 800 and an integrated photodetector device 900 are used.

FIG. 7 is a schematic diagram showing a general structure of a WDM optical transmission system using an integrated laser light source 800 and an integrated photodetector device 900 according to the invention. The system according to the invention comprises an optical transmitter 800, optical fiber 200 and optical receiver 900. Used as the optical transmitter 800 is any of the WDM optical transmission devices explained with reference to FIGS. 1A through FIG. 5. Used as the optical receiver 900 is the WDM optical transmission device explained with reference to FIG. 6. Although the transmission shown in FIG. 7 is for only one direction, a full-duplex transmission system can be realized by providing both the optical transmitter and the optical receiver at each end of the optical fiber 200.

According to the invention, by using a transmitter 800 and a receiver 900, which require no demultiplexer and no amplifier and are downsized, both the transmitter and the receiver are simplified, and WDM optical transmission can be provided inexpensively and improved in reliability.

What is claimed is:

1. A wavelength division multiplexing optical transmission device comprising a plurality of laser-type elements, wherein:
   each said laser-type element is one of a DFB laser-type element and a DBR laser-type element;
   each said laser-type element has a waveguide which has formed Bragg diffraction gratings whose order of diffraction is second-order or a higher order; and
   said laser-type elements are arranged so that radiation mode light beams irradiated from said Bragg diffraction gratings by laser oscillation of said laser-type elements are coaxially aligned.

2. The wavelength division multiplexing optical transmission device according to claim 1 wherein said laser-type elements are different in oscillation wavelength from each other upon laser oscillation thereof.

3. The wavelength division multiplexing optical transmission device according to claim 1 further comprising a plurality of optical modulators associated with said laser-type elements, respectively, and each said optical modulator being configured to introduce radiation mode light irradiated from said Bragg diffraction gratings upon oscillation of associated one of said laser elements, to convert said radiation mode light and to output an optical output thereof onto a common axis coaxially with optical outputs from the other optical modulators.

4. The wavelength division multiplexing optical transmission device according to claim 1 wherein said diffraction gratings in each said laser-type element are partly removed to suppress the radiation mode optical output on said common axis.

5. The wavelength division multiplexing optical transmission device according to claim 1 wherein the order of diffraction of each said diffraction gratings is second-order.

6. The wavelength division multiplexing optical transmission device according to claim 1 wherein each said laser-type element includes phase shifting regions or a waveguide structure effectively functioning to shift the phase in said diffraction gratings so that the intensity of said radiation mode light be larger in a predetermined region for extracting the optical output.

7. The wavelength division multiplexing optical transmission device according to claim 1 wherein said laser-type elements are monolithically stacked on a semiconductor substrate to form an integral structure, each said diffraction gratings being formed on a plane parallel to the major surface of said semiconductor substrate.

8. The wavelength division multiplexing optical transmission device according to claim 1 wherein said laser-type elements are monolithically arranged in parallel with each other on a common substrate surface to align waveguides thereof substantially in parallel with each other on said substrate surface, each said diffraction gratings being formed on a side surface of said waveguide normal to said substrate surface.

9. The wavelength division multiplexing optical transmission device according to claim 8 further comprising photodetector elements each of which being provided for each of said laser-type element to monitor laser light irradiated from each of said laser-type element.

10. The wavelength division multiplexing optical transmission device according to claim 8 further comprising inter-element waveguides, said laser-type elements are coupled to each other by the each of the inter-element waveguides located to guide said radiation mode optical output.

11. The wavelength division multiplexing optical transmission device according to claim 10 wherein each said inter-element waveguide has an optically amplifying function.

12. The wavelength division multiplexing optical transmission device according to claim 10 wherein each said inter-element waveguide is a ridge waveguide.

13. The wavelength division multiplexing optical transmission device according to claim 1 wherein each said laser-type element has a portion substantially transparent to said radiation mode light, where said active layer and said electrode are partly removed on said common axis, not to interrupt said radiation mode light irradiated from any other said laser-type element along said common axis.

14. The wavelength division multiplexing optical transmission device according to claim 1 wherein, in each said laser-type element, an anti-reflection coat is formed onto at least one of a surface from which said radiation mode light from said element is irradiated and a surface for introducing said radiation mode light irradiated from another element.

15. A wavelength division multiplexing optical transmission device comprising a plurality of photodetector elements, each said photodetector element including:
   an active layer made of a material absorbing an incident signal light; and
   a waveguide having formed Bragg diffraction gratings whose order of diffraction is second-order or a higher order, so that input light from the exterior into said waveguide can be converted into an electric signal.

16. The wavelength division multiplexing optical transmission device according to claim 15 wherein said photodetector elements are arranged to align radiation mode light irradiated from each said Bragg diffraction gratings upon laser oscillation thereof onto a common axis coaxially with radiation mode light from any other said Bragg diffraction gratings.

17. The wavelength division multiplexing optical transmission device according to claim 15 further comprising inter-element waveguides, said photodetector elements being coupled to each other by each of the inter-element waveguides.

18. The wavelength division multiplexing optical transmission device according to claim 17 wherein each said inter-element waveguide has an optically amplifying function.

19. A wavelength division multiplexing optical transmission system comprising an optical transmitter, an optical fiber and an optical receiver to transmit information via light of a plurality of wavelength bands, wherein said transmitter includes a plurality of laser-type elements, each said laser-type element being one of a DFB laser-type element and a DBR laser-type element, each said laser-type element having a waveguide which has formed Bragg diffraction gratings whose order of diffraction is second-order or a higher order, said laser-type elements being arranged to align radiation mode light irradiated from each said Bragg diffraction gratings upon laser oscillation onto a common axis coaxially with radiation mode light from any other said Bragg diffraction gratings.

20. A wavelength division multiplexing optical transmission system comprising an optical transmitter, an optical fiber and an optical receiver to transmit information via light of a plurality of wavelength bands, wherein said optical receiver includes a plurality of photodetector elements, each said photodetector element having an active layer made of a material absorbing incident signal light and a waveguide having formed a Bragg diffraction gratings whose order of diffraction is second-order or a higher order, so that input light from the exterior into said waveguide can be converted into an electric signal.

* * * * *